United States Patent Office 3,287,329
Patented Nov. 22, 1966

3,287,329
POLYSULFONES AND PROCESSES FOR THE PREPARATION THEREOF
Manuel Slovinsky, Fanwood, N.J., assignor to Celanese Corporation of America, New York, N.Y., a corporation of Delaware
No Drawing. Filed Mar. 19, 1963, Ser. No. 266,210
13 Claims. (Cl. 260—79.3)

This invention relates to the preparation of polysulfones and, more particularly, to polysulfones formed from the reaction of sulfur dioxide and at least one compound having a monoethylenically unsaturated furan ring.

In accordance with a preferred embodiment of the invention, sulfur dioxide is reacted with at least one compound having a monoethylenically unsaturated furan ring, in the presence of a catalytic amount of a polymerization catalyst therefor. Preferably, the compound, which may be referred to as a furan derivative, is a dihydrofuran; and in a particularly preferred embodiment of this invention, said dihydrofuran is 2,5 dihydrofuran

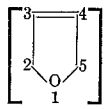

which is also known as oxacyclopentene-3.

The compounds suitable for this invention have a monoethylenically unsaturated furan ring, where "furan ring" is intended to represent the structure

and any substituents on said ring are inert to the reactants under the conditions of the polymerization reaction (i.e. the term "inert" as applied to the substituents in the disclosure and the claims denotes that the substituents do not substantially reduce the rate of reaction of the monoethylenic unsaturation of the furan ring with sulfur dioxide, as, for example, by steric hindrance, and do not react with either sulfur dioxide or another furan ring compound or at least the rate of reaction of any substituent on said furan ring with either sulfur dioxide or another furan ring compound is less than the rate of reaction of the monoethylenic unsaturation of said furan ring with said sulfur dioxide). The compounds having monoethylenically unsaturated furan rings can also be described as oxolenes; oxacyclopentenes; or dihydrofurans, even where one or more of the hydrogen atoms are replaced by suitable substituents.

Suitable substituents include, for example, hydrogen; a halogen (e.g. chlorine, bromine, etc.); an alkyl group containing from 1–10 carbon atoms (e.g. methyl, ethyl, butyl, isopropyl, etc.); an aryl group such as phenyl, tolyl, xylyl, etc.; an —OH group; a —COOH group; a —COOR group; a —CHO group; a —C=O group; a —CN group; an —OCOR group; an —OR group, etc., wherein in each instance above R represents an alkyl group of 1–10 carbon atoms. Representative compounds include, for example 2,5-dimethyloxacyclopentene-3; 2-ethyloxacyclopentene-3; 2-methyl, 5-methoxyoxacyclopentene-3; 2-phenyloxacyclopentene-3; 2-methyl, 5 carboxyoxacyclopentene-3; 2-cyano, 5-methyloxacyclopentene-3, etc.

Suitable compounds also include furylidenes

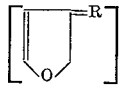

wherein R is an alkyl group having 1 to 10 carbon atoms, and/or oxacyclopentene compounds having substituents containing olefinic unsaturation (e.g. 2-allyloxacyclopentene-3; 2 vinyloxacyclopentene-3, etc.). In these latter instances (furylidenes, or olefinically unsaturated substituted oxacyclopentenes) the reaction may proceed to completion at the olefinic unsaturation of the furan ring producing a polysulfone product capable of further condensation and cross linking reactions; or reactions at both olefinic bonds may proceed with substantial simultaneity at different rates yielding a cross linked polysulfone product.

The furan ring compounds may be provided as a single material or as mixtures in any proportions of two or more of the said compounds.

While the proportions of sulfur dioxide and furan ring compounds may vary with the reactants and reaction conditions, preferably the total molar amount of the furan ring compound present in the product is equal to the molar amount of the sulfur dioxide present in the product.

The reactant sulfur dioxide may be advantageously employed in excess, especially where substantially simultaneous reactions occur, each utilizing sulfur dioxide, at two reaction sites. Generally, from about 0.5 to 30, preferably from about 1.0 to 20 moles of sulfur dioxide are provided per mole of the furan ring compound. Liquid sulfur dioxide can be employed as a solvent for the reaction, or the reactant sulfur dioxide may be supplied as a gas, in which cases the proportion of sulfur dioxide would, of course, be much greater. Emulsion polymerization techniques (e.g. sulfur dioxide saturated aqueous systems under pressure) are employed very successfully for the preparation of polysulfones, wherein the amount of sulfur dioxide that may be initially charged is unlimited.

The polymerization catalyst may be of any suitable type including, for example, free radical-yielding catalysts, such as organic peroxides, represented by, for example, benzoyl peroxide, acetyl peroxide, lauroyl peroxide, succinyl peroxide, acetyl benzyl peroxide, oleayl peroxide, urea peroxide, di-t-butyl peroxide, dichlorobenzoyl peroxide, α-dicumyl peroxide; organic hydroperoxides, such as t-butyl hydroperoxide, cumene hydroperoxide, α-α-dimethylbenzyl hydroperoxide, and t-isopropyl benzene hydroperoxide; azo compounds, such as dimethyl α-α-azodiisobutyrate, α-α-azodiisobutyronitrile, and azodicyclohexyl carbonitrile; inorganic oxidizing agents, such as hydrogen peroxide, alkali metal and ammonium persulfates, percarbonates, perborates, nitrates, chlorates, perchlorates, etc. (especially sodium, lithium and potassium derivatives), and further including the corresponding alkyl salts; ionic free radical catalysts, such as ferrous ion and hydrogen peroxide, ferrous ion and cumene hydroperoxide, peroxydisulfate and thiosulfate ion, hydrogen peroxide and zinc formaldehyde sulfoxylate, hydrogen peroxide and a trivalent titanium salt, potassium persulfate and sodium bisulfite, trivalent titanium and hydroxylamine in acid solution, ammonium persulfate and sodium metabisulfate, a bromate mixed with a bisulfite, etc. The reaction may, of course, also be catalyzed by actinic radiation where desirable.

The polymerization catalyst may be present in any suitable concentration, such as from about 0.01 to about 5.0 percent, but preferably is present in proportions from about 0.1 to 2.0 percent, based on the total weight of the furan ring compound and the sulfur dioxide.

Suspension or emulsion systems are also satisfactory for the polymerization reaction of this invention, and may be desirable in certain cases in view of the generally lower activation energies of peroxide induced polymerization reactions in these systems.

The reaction may advantageously be carried out in an inert solvent including, for example, water, a lower alkanol containing 1–10 carbon atoms, a mixture of alcohol and water, cyclohexane, acetone, etc., as well as any other common solvent which does not take part in any undesirable side reactions with the catalysts or reactants. Liquid sulfur dioxide may also be supplied in such excess as to constitute an operable solvent for the reaction. Where water is employed as the inert medium, an emulsifying agent such as the alkali metal salts of certain alkyl acid sulfates, e.g. sodium lauryl sulfate, can advantageously be employed. If a viscous liquid product is desired, a solvent for the product may be employed as the inert medium for the reaction; as, for example, dimethyl formamide, dimethylsulfoxide, dimethylacetamide, etc.

The choice of the appropriate inert medium may be governed by various factors. For example, certain otherwise operable solvents may be eliminated from consideration by virtue of their relatively high viscosity at the temperature to be employed in a particular reaction, or by virtue of the solubility or operability in the solvent of the polymerization catalyst to be employed. Where redox type catalytic systems are employed, an aqueous medium may be advantageous or necessary, and buffers may be necessary to control the pH of the solution.

Although small amounts of molecular oxygen accelerate the reaction by the formation of free radical peroxides, the presence of a substantial amount of molecular oxygen acts as an inhibitor in the polymerization reaction. The effect of excess molecular oxygen may be substantially mitigated by the presence of a reducing agent, as supplied, for example, by a redox type catalyst system, which reduces the peroxides formed to active free radicals as soon as they are formed. It may also be desirable to remove any molecular oxygen or other gaseous inhibitor by flushing the system with an inert gas, such as nitrogen, and/or maintaining an atmosphere of inert gas. Sulfur dioxide may also serve this function when supplied as a gas to the reaction vessel.

The conditions of the reaction will, of course, be governed by the nature of the particular furan derivative or derivatives employed, the physical state of the sulfur dioxide and the effectiveness of the particular polymerization catalyst employed under various reaction conditions.

Where it is desirable to supply the sulfur dioxide as a liquid, the temperature must be below $-10°$ C. (boiling point of sulfur dioxide) at atmospheric pressure. However, pressures lower or higher than atmospheric may be utilized with equally good results, especially where an inert solvent medium is utilized.

The temperature of the reactants is generally maintained at from about $-20°$ to $50°$ C., preferably from about $-5°$ to $20°$ C. The reaction time is generally in the range between about 5 minutes and 24 hours, preferably between about 5 and 14 hours.

The polymer may be recovered from solution by any suitable means, such as precipitation; coagulation with methanol or an ionizing salt such as sodium chloride, magnesium sulfate, potassium sulfate, etc.

It may be desirable in certain applications to employ plasticizers or stabilizers for the polysulfone product. Stabilizers which are frequently used are, for example, metallic tin; a tin hydroxide; a tin oxide or other salt; organic mono- and disulfides; amides; imides; esters of tetrathiophosphoric acid and trithiophosphoric acid; various thiophosphoric acid derivatives including metal alkyl derivatives; reaction products of vinyl cyclohexene with hydrogen sulfide; naphthalene thiols; and benzimidazole-thiols. Plasticizers which can be employed include various organic phosphoric acid derivatives, sulfonamides, nitriles, etc. If desired, other materials can also be incorporated in the polysulfone products, such as fillers or coloring materials, such as dyes or pigments.

The polysulfone products are generally amorphous, and are soluble in such solvents as dimethyl formamide, dimethylsulfoxide, dimethylacetamide, etc., some of which solutions can be spun into fibers or cast into films. The polysulfones of this invention are also generally thermoplastic and can be molded into shaped articles by injection and compression molding techniques.

The following example will serve to further illustrate a specific embodiment of this invention.

*Example*

2,5-dihydrofuran, 70 g. (1 mole) liquid sulfur dioxide 192 g. (3 moles) and a solution of 0.8 g. $NH_4NO_3$ in 8 ml. of methanol were charged into a conic flask suitable for high pressure. The flask was previously swept with nitrogen and the reactants were charged under a nitrogen stream. The flask was maintained at room temperature and formation of insoluble polymer could be observed. The flask was then cooled to remove the contents which were dissolved in dimethyl sulfoxide and precipitated in an aqueous magnesium sulfate solution. The white polymer was separated and washed twice in a Waring Blendor with water and twice with methanol. After drying in a vacuum oven at $60°$ C. overnight, 50 g. (37.3% based on 2,5-dihydrofuran for a 1:1 copolymer with $SO_2$) of polysulfone product was obtained having a melting point of $195°$ C.

The inherent viscosity (logarithm of the relative viscosity divided by the concentration of the solution) of the polymer, measured in a 0.1 wt. percent solution in dimethyl sulfoxide at $25°$ C. was 0.38.

The elemental analysis was C=34.8%; H=4.7%; S=23.7%. Required for a 1:1 copolymer: C=35.8%; H=4.47%; S=23.9%.

It is to be understood that the foregoing detailed description is given merely by way of illustration and that many variations may be made therein without departing from the spirit of my invention.

Having described my invention what I desire to secure by Letters Patent is:

1. A normally solid polysulfone of sulfur dioxide and at least one compound having a monoethylenically unsaturated furan ring, said polysulfone consisting essentially of recurring $-SO_2-$ units interspersed with recurring dihydrofuran units having the structure

wherein all substituents attached to the carbon atoms are hydrogen.

2. The polysulfone of claim 1, wherein said furan radical has the structure

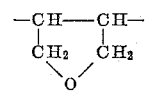

3. A film of the polysulfone of claim 1.
4. A fiber of the polysulfone of claim 1.
5. A normally solid polysulfone of sulfur dioxide and 2,5-dihydrofuran, said polysulfone consisitng of alternately recurring $-SO_2-$ units and

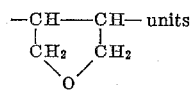 units

6. A process for the preparation of normally solid polysulfones consisting essentially of recurring $-SO_2-$ units interspersed with recurring dihydrofuran units having the structure

wherein all substituents attached to the carbon atoms are hydrogen comprising reacting sulfur dioxide and at least one dihydrofuran in the presence of a catalytic amount of a free radical polymerization catalyst.

7. A process for the preparation of normally solid polysulfones consisting essentially of recurring —SO$_2$— units and recurring dihydrofuran units having the structure

wherein all substituents attached to the carbon atoms are hydrogen comprising copolymerizing at least one mole of sulfur dioxide per mole of said dihydrofuran in the presence of a catalytic amount of between about 0.01 to about 5.0 weight percent of a free radical-yielding polymerization catalyst therefor, at a temperature of between about —20° to about 50° C.

8. The process of claim 7, wherein said free radical-yielding catalyst is ammonium nitrate.

9. The process of claim 7, wherein said furan compound is a dihydrofuran.

10. The process of claim 9, wherein said dihydrofuran is 2,5 dihydrofuran.

11. The process of claim 7 wherein the reaction medium comprises an inert solvent.

12. The process of claim 11, wherein said inert solvent is a lower alkanol.

13. The process of claim 11, wherein said inert solvent is dimethyl sulfoxide.

References Cited by the Examiner

UNITED STATES PATENTS 2,114,292  4/1938  Frey et al. _____ 260—79.3

JOSEPH L. SCHOFER, *Primary Examiner.*

J. F. McNALLY, D. K. DENENBERG,
*Assistant Examiners.*